US008693089B2

(12) United States Patent
Saitoh et al.

(10) Patent No.: US 8,693,089 B2
(45) Date of Patent: Apr. 8, 2014

(54) IR CUT FILTER (75) Inventors: Hideshi Saitoh, Kakogawa (JP); Manabu Ohnishi, Kakogawa (JP)

(73) Assignee: Daishinku Corporation, Kakogawa-shi (JP)

( * ) Notice: Subject to any disclaimer, the term of this patent is extended or adjusted under 35 U.S.C. 154(b) by 0 days.

(21) Appl. No.: 13/322,504

(22) PCT Filed: May 27, 2011

(86) PCT No.: PCT/JP2011/062225
§ 371 (c)(1),
(2), (4) Date: Nov. 25, 2011

(87) PCT Pub. No.: WO2011/158635
PCT Pub. Date: Dec. 22, 2011

(65) Prior Publication Data
US 2013/0094075 A1    Apr. 18, 2013

(30) Foreign Application Priority Data
Jun. 18, 2010   (JP) .................................. 2010-139686

(51) Int. Cl.
F21V 9/04      (2006.01)
G02B 5/22      (2006.01)
G02B 5/26      (2006.01)
G02B 5/20      (2006.01)

(52) U.S. Cl.
CPC ..................................... G02B 5/208 (2013.01)
USPC ......................................... 359/359; 359/589

(58) Field of Classification Search
None
See application file for complete search history.

(56) References Cited

U.S. PATENT DOCUMENTS

2006/0291061 A1   12/2006   Iyama et al.
2008/0285119 A1   11/2008   Iyama et al.
2009/0303590 A1   12/2009   Irie

FOREIGN PATENT DOCUMENTS

| JP | 11-305033 A | 11/1999 |
| JP | 2000-209510 A | 7/2000 |
| JP | 2003-161831 A | 6/2003 |
| JP | 2005-345680 A | 12/2005 |
| JP | 2006-154395 A | 6/2006 |
| JP | 2006-220873 A | 8/2006 |

OTHER PUBLICATIONS

Annotated Figure 3 of JP 2006-154395A (of record), Published Jun. 15, 2006.*

* cited by examiner

*Primary Examiner* — Derek S Chapel
(74) *Attorney, Agent, or Firm* — Marvin A. Motsenbocker; Mots Law, PLLC (57) ABSTRACT An IR cut filter includes an infrared light absorber to absorb infrared light, and an infrared light reflector to reflect infrared light. The infrared light absorber has a light transmission property of 50% transmittance with respect to a wavelength in a wavelength band of 620 to 670 nm. The infrared light reflector has a light transmission property of 50% transmittance with respect to a wavelength in a wavelength band of 670 to 690 nm. The wavelength with respect to which the infrared light reflector has the 50% transmittance is longer than the wavelength with respect to which the infrared light absorber has the 50% transmittance. A combination of the infrared light absorber and the infrared light reflector provides a light transmission property of 50% transmittance with respect to a wavelength in the 620 to 670 nm wavelength band and less than 5% transmittance with respect to a 700 nm wavelength.

10 Claims, 7 Drawing Sheets

IR CUT FILTER

TECHNICAL FIELD

The present invention relates to an IR cut filter that transmits light radiation in the visible spectrum and blocks infrared light.

BACKGROUND ART

The optical system of typical electronic cameras such as widely used video cameras and digital still cameras include imaging optics, IR cut filters, optical low pass filters, and imaging devices such as Charge Coupled Devices (CCD) and Complementary Metal Oxide Semiconductors (CMOS). These are arranged in the order set forth along the optical axis starting from the side of a photographic subject (see, for example, patent document 1).

These imaging devices have sensitive properties of being responsive to light radiation in a wavelength band that is wider than the wavelength band of visible radiation detectable by the human eye (the visible spectrum). Thus, the imaging devices are responsive to light radiation in the infrared spectrum in addition to the visible spectrum.

Specifically, the human eye responds to light radiation in a wavelength range from approximately 400 nm to 620 nm in dark locations and to light radiation in a wavelength range from 420 nm to 700 nm in bright locations. In contrast, for example, a CCD responds to light radiation beyond a wavelength of 700 nm in addition to light radiation in the wavelength range from 400 nm to 700 nm.

In view of this, an imaging device, as disclosed in patent document 1, uses an IR cut filter in addition to a CCD as an imaging device so as to prevent light radiation in the infrared spectrum from reaching the imaging device, in an attempt to obtain images as close to those perceived by the human eye as possible.

RELATED ART DOCUMENTS

Patent Documents

Patent document 1: Japanese Unexamined Patent Application Publication No. 2000-209510.

SUMMARY OF THE INVENTION

Problems to be Solved by the Invention

Conventional examples of IR cut filters include: an infrared absorbing glass that transmits light radiation in the visible spectrum (visible light radiation) and absorbs light radiation in the infrared spectrum (infrared light); and an IR cut coating that transmits visible light radiation and reflects infrared light.

Examples of the infrared absorbing glass include a blue glass with pigments such as of copper ions dispersed.

Examples of the IR cut coating include a dielectric multilayer film that includes, over a transparent substrate, some tens of alternately laminated layers of: a high refractive index material such as $TiO_2$, $ZrO_2$, $Ta_2O_5$, and $Nb_2O_5$; and a low refractive index material such as $SiO_2$ and $MgF_2$.

The infrared absorbing glass and the IR cut coating will be described below by referring to FIGS. 7 and 8.

Figure 7:
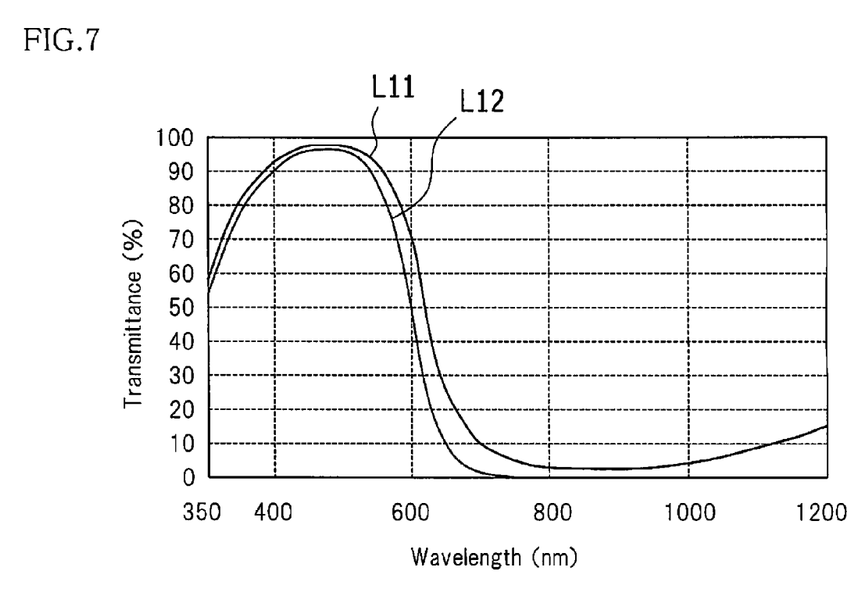
FIG. 7 is a graph illustrating a light transmission property of an infrared absorbing glass.

FIG. 7 shows light transmission properties L11 and L12 of two infrared absorbing glasses with different thicknesses. Specifically, the thickness of the infrared absorbing glass of light transmission property L11 is equal to or less than half the thickness of the infrared absorbing glass of light transmission property L12.

As seen from L11 and L12 in FIG. 7, when infrared absorbing glasses are used as an IR cut filter, a "sensitive property of gradual decrease in transmittance", which is a property close to the sensitive property of the human eye, is obtained throughout the visible spectrum and the infrared spectrum. A comparison between the light transmission properties L11 and L12 shows that the thinner infrared absorbing glass has a higher transmittance in the visible spectrum, especially in the wavelength band of 600 nm to 700 nm.

For example, the infrared absorbing glass of light transmission property L11 shown in FIG. 7 has 10% transmittance with respect to light radiation of 700 nm wavelength, and transmits light radiation of approximately 750 nm wavelength. Thus, this infrared absorbing glass is unable to sufficiently block light radiation in the infrared spectrum. This causes the imaging device to capture an image in the infrared spectrum, which is unconceivable by the human eye.

In contrast, as seen from the light transmission property L12, the infrared absorbing glass having a thickness equal to or more than twice the thickness of the infrared absorbing glass of light transmission property L11 has approximately 0% transmittance with respect to light radiation of 700 nm wavelength, thus sufficiently blocking light radiation with a wavelength in excess of 700 nm.

In view of this, conventional IR cut filters used the infrared absorbing glass of light transmission property L12.

However, when the infrared absorbing glass of light transmission property L12 is used as the IR cut filter, this infrared absorbing glass shows a light transmission property of approximately 50% transmittance with respect to 600 nm wavelength. Thus, the transmittance with respect to red visible light radiation of 600 nm to 700 nm wavelengths is low compared with the infrared absorbing glass of light transmission property L11, which has approximately 50% transmittance with respect to 640 nm wavelength. This poses an inconvenience of insufficient transmission of red visible light radiation. The imaging elements of imaging devices such as CCD and CMOS are less sensitive to red than to blue and green. For this reason, insufficient transmission of red visible light radiation causes insufficient red detection on the imaging elements. As a result, the imaging device captures a redness deficient, dark image.

Thus, use of infrared absorbing glasses as the IR cut filter fails to match the point of approximately 0% transmittance with 700 nm while sufficiently transmitting red visible light.

Figure 8:
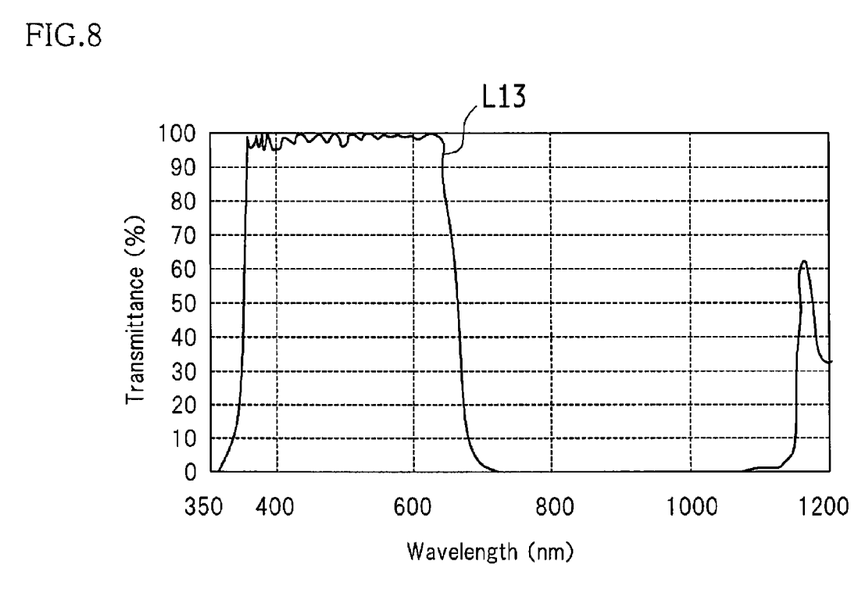
FIG. 8 is a graph illustrating a light transmission property of an IR cut coating.

Next, as seen from L13 in FIG. 8, when an IR cut coating is used as an IR cut filter, a "sensitive property of rapid decrease in transmittance" is obtained throughout the visible spectrum and the infrared spectrum. This facilitates matching of the point of approximately 0% transmittance with 700 nm while sufficiently transmitting red visible light.

Unfortunately, IR cut coatings block infrared light by reflection instead of by absorption. Thus, light reflection repeats between an IR cut coating and the imaging optics, thereby causing occurrence of ghost.

The present invention has been made in view of the above-described circumstances, and it is an object of the present invention to provide an IR cut filter that sufficiently transmits red visible light radiation of 600 nm to 700 nm wavelengths and minimizes occurrence of ghost while sufficiently blocking light radiation of wavelengths in excess of 700 nm.

Means of Solving the Problem

According to one aspect of the present invention, an IR cut filter to block infrared light includes an infrared light absorber and an infrared light reflector. The infrared light absorber is configured to absorb the infrared light. The infrared light reflector is configured to reflect the infrared light. The infrared light absorber has a light transmission property of 50% transmittance with respect to a wavelength in a wavelength band of 620 nm to 670 nm. The infrared light reflector has a light transmission property of 50% transmittance with respect to a wavelength in a wavelength band of 670 nm to 690 nm. The wavelength with respect to which the infrared light reflector has the 50% transmittance is longer than the wavelength with respect to which the infrared light absorber has the 50% transmittance. A combination of the infrared light absorber and the infrared light reflector provides a light transmission property of 50% transmittance with respect to a wavelength in the wavelength band of 620 nm to 670 nm and less than 5% transmittance with respect to a wavelength of 700 nm.

With this IR cut filter, the infrared light absorber having a light transmission property of 50% transmittance with respect to a wavelength in a wavelength band of 620 nm to 670 nm combines with the infrared light reflector having a light transmission property of 50% transmittance with respect to a wavelength in a wavelength band of 670 nm to 690 nm. This ensures a light transmission property close to the sensitive property of the human eye; the transmittance gradually decreases through the visible spectrum and the infrared spectrum into approximately 0% with respect to a wavelength of 700 nm.

The IR cut filter according to the one aspect of the present invention includes an infrared light absorber having a light transmission property of 50% transmittance with respect to a wavelength in a wavelength band of 620 nm to 670 nm, examples including the infrared absorbing glass of light transmission property L11 shown in FIG. 7. The point of approximately 0% (less than 5%) transmittance is matched with 700 nm by the combination of the infrared light absorbing effect by the infrared light absorber and the infrared light reflecting effect by the infrared light reflector. This ensures that the IR cut filter according to the one aspect of the present invention maintains high transmittance in the visible spectrum, especially in the wavelength band of 600 nm to 700 nm, compared with the conventional IR cut filter using the infrared absorbing glass of light transmission property L12 shown in FIG. 7. That is, the IR cut filter transmits a sufficient amount of red light radiation (light radiation of 600 nm to 700 nm wavelengths) detectable by the imaging element of the imaging device while blocking infrared light of wavelengths in excess of 700 nm. Thus, applying the IR cut filter according to the one aspect of the present invention to IR cut filters of imaging units eliminates the disadvantageous tendency toward darkness in the images captured by the imaging devices due to weak red sensitivity of the imaging elements.

In the IR cut filter according to the one aspect of the present invention, the infrared light reflector is combined with the infrared light absorber to minimize the amount of light reflected by the infrared light reflector. Specifically, the half-wavelength (wavelength at which the transmittance is 50%) of an infrared light reflector 3 is longer than the half-wavelength of an infrared light absorber 2, so that infrared light absorption by the infrared light absorber 2 minimizes the amount of light (infrared light) reflected by the infrared light reflector 3. This minimizes occurrence of ghost caused by the light reflection at the infrared light reflector.

As described above, the infrared absorbing glass of light transmission property L11 shown in FIG. 7, which has 50% transmittance with respect to 640 nm wavelength, has a thickness that is equal to or less than half the thickness of the infrared absorbing glass of light transmission property L12 shown in FIG. 7, which is a conventional IR cut filter. In accordance with this teaching, the infrared light absorber that constitutes the IR cut filter according to the one aspect of the present invention and that has a light transmission property of 50% transmittance with respect to a wavelength in the wavelength band of 620 nm to 670 nm may be thinner than the IR cut filter made of the conventional infrared absorbing glass of light transmission property L12 shown in FIG. 7. This ensures an IR cut filter that blocks infrared light while sufficiently transmitting red visible light radiation, and that has a light transmission property close to the human eye in the visible spectrum, even though the IR cut filter has a thickness equal to or thinner than the conventional IR cut filter made of an infrared light absorber alone.

In the IR cut filter according to the one aspect of the present invention, the infrared light absorber may have a light transmission property of 10% to 40% transmittance with respect to a wavelength of 700 nm, and the infrared light reflector may have a light transmission property of less than 15% transmittance with respect to a wavelength of 700 nm.

The IR cut filter includes a combination of the infrared light absorber having a light transmission property of 10% to 40% transmittance with respect to a wavelength of 700 nm and the infrared light reflector having a light transmission property of less than 15% transmittance with respect to a wavelength of 700 nm. The combination ensures high transmittance in the wavelength band of red visible light radiation (600 nm to 700 nm).

In the IR cut filter according to the one aspect of the present invention, the infrared light reflector may have light transmission properties of equal to or more than 80% transmittance with respect to each wavelength in a wavelength band of 450 nm to 650 nm, and equal to or more than 90% average transmittance in the wavelength band of 450 nm to 650 nm.

The IR cut filter obtains a light transmission property that depends on the light transmission property of the infrared light absorber in the wavelength band of 450 nm to 650 nm. The obtained light transmission property is close to the sensitive property of the human eye; the transmittance gradually decreases through the visible spectrum and the infrared spectrum into approximately 0% with respect to a wavelength of 700 nm. Additionally, high transmittance is obtained in the visible spectrum, especially in the wavelength band of red visible light radiation (600 nm to 700 nm).

In the IR cut filter according to the one aspect of the present invention, a single infrared light reflector may be disposed on one principal surface of a single infrared light absorber.

The IR cut filter includes a single infrared light reflector on one principal surface of a single infrared light absorber. This makes the IR cut filter thinner compared with an IR cut filter in which the infrared light absorber and the infrared light reflector are separately disposed. This in turn makes thinner an imaging unit that internally includes this IR cut filter.

Effects of the Invention

According to the one aspect of the present invention, an IR cut filter is provided that blocks light radiation of wavelengths in excess of 700 nm and minimizes occurrence of ghost while sufficiently transmitting red visible light radiation of 600 nm to 700 nm wavelengths.

MODES FOR CARRYING OUT THE INVENTION

Embodiments of the present invention will be described below by referring to the accompanying drawings.
<Embodiment 1>

Figure 1:
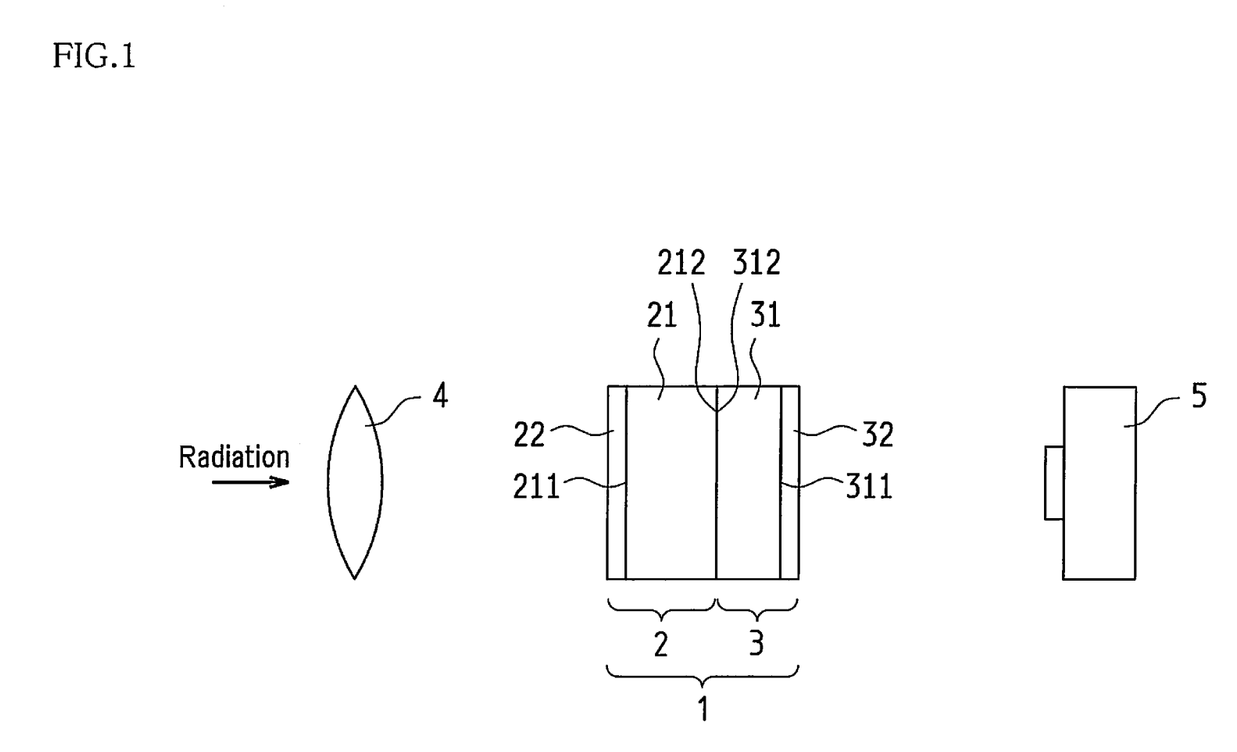
FIG. 1 is a schematic diagram illustrating an imaging unit according to embodiment 1 including an IR cut filter.

As shown in FIG. 1, an IR cut filter 1 according to embodiment 1 is disposed in an imaging unit between an imaging optics 4 and an imaging device 5, which are aligned along the optical axis of an imaging optical path.

The IR cut filter 1 includes an infrared light absorber 2 and an infrared light reflector 3 that are bonded to each other. The infrared light absorber 2 transmits visible light radiation and absorbs infrared light. The infrared light reflector 3 transmits visible light radiation and reflects infrared light. That is, the IR cut filter 1 has a configuration in which a single infrared light reflector 3 is disposed on one principal surface of a single infrared light absorber 2 (on the other principal surface 212 of an infrared absorbing glass 21, described later).

The infrared light absorber 2 includes the infrared absorbing glass 21 and an anti-reflection film 22 (AR coating) on the one principal surface 211 of the infrared absorbing glass 21.

The infrared absorbing glass 21 is a blue glass with pigments such as of copper ion dispersed, examples including a rectangular thin glass plate of 0.2 to 1.2 mm thick.

The anti-reflection film 22 is formed by vacuum deposition using a well-known vacuum deposition apparatus (not shown). Either a single layer of $MgF_2$, a multilayer film of $Al_2O_3$, $ZrO_2$, and $MgF_2$, or a multilayer film of $TiO_2$ and $SiO_2$ is deposited on the one principal surface 211 of the infrared absorbing glass 21. During the deposition operation of the anti-reflection film 22, the film thickness thereof is monitored so that at the time when the film thickness reaches a predetermined film thickness, a shutter (not shown) adjacent to an evaporation source (not shown) is closed to stop the deposition of the evaporant, thus discontinuing the deposition operation. The anti-reflection film 22 has a refractive index that is larger than the refractive index N (approximately 1.0) of atmosphere in atmosphere and that is smaller than the refractive index of the infrared absorbing glass 21.

The infrared light absorber 2 has light transmission properties of 50% transmittance with respect to a wavelength in the wavelength band of 620 nm to 670 nm and 10% to 40% transmittance with respect to a wavelength of 700 nm. The infrared light absorber 2 of such light transmission property has a maximum transmittance of equal to or more than 90% with respect to a wavelength in the wavelength band of 400 nm to 550 nm.

The infrared light reflector 3 includes a transparent substrate 31 and an infrared light reflecting film 32 on one principal surface 311 of the transparent substrate 31.

The transparent substrate 31 includes a clear and colorless glass that transmits visible light radiation and infrared light, examples including a rectangular thin glass plate with a thickness of 0.2 to 1.0 mm.

Figure 2:
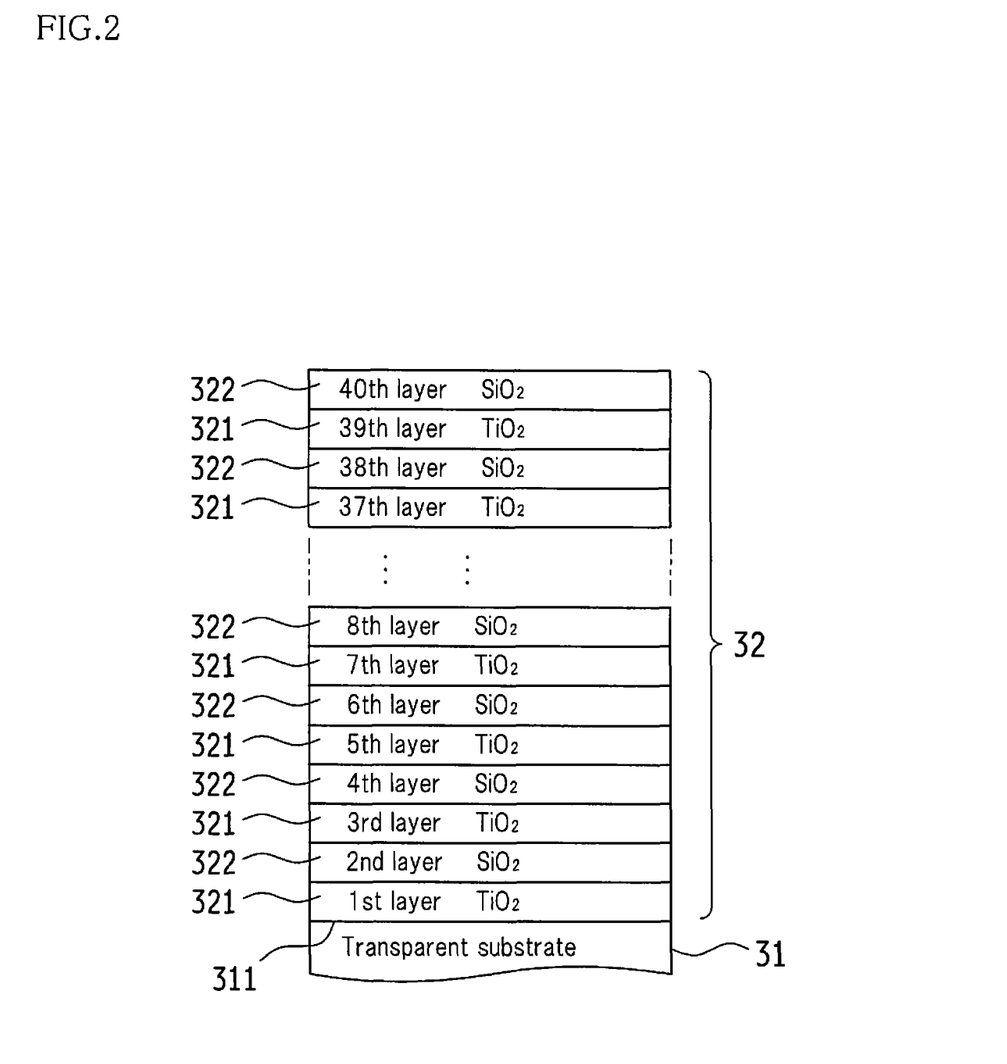
FIG. 2 is a partially enlarged view of an infrared light reflector of the IR cut filter according to embodiment 1, illustrating a schematic configuration of the infrared light reflector.

As shown in FIG. 2, the infrared light reflecting film 32 is a multilayer film of a first thin film 321 of high refractive index material and a second thin film 322 of low refractive index material, the first thin film 321 and the second thin film 322 being alternately laminated a plurality of times. In embodiment 1, the first thin film 321 uses $TiO_2$ and the second thin film 322 uses $SiO_2$. Thus, the odd-numbered layers are $TiO_2$ and the even-numbered layers are $SiO_2$, with the final layer being $SiO_2$. However, the odd-numbered layers may be $SiO_2$ and the even-numbered layers may be $TiO_2$ insofar as the final layer is $SiO_2$ for film designing reasons.

As a fabrication method used to fabricate the infrared light reflecting film 32, $TiO_2$ and $SiO_2$ are alternately deposited on the one principal surface 311 of the transparent substrate 31 using a well-known vacuum deposition apparatus (not shown), thus producing the infrared light reflecting film 32 shown in FIG. 2. The film thickness adjustment of the thin films 321 and 322 is carried out such that during the deposition operation of the thin films 321 and 322, the film thicknesses thereof are monitored so that at the time when the film thicknesses reach predetermined film thicknesses, a shutter (not shown) adjacent to an evaporation source (not shown) is closed to stop the deposition of the evaporants ($TiO_2$, $SiO_2$), thus discontinuing the deposition operation.

As shown in FIG. 2, the infrared light reflecting film 32 includes a plurality of layers defined by ordinal numbers in order starting on the one principal surface 311 side of the transparent substrate 31, namely, a first layer, a second layer, a third layer, and so forth in embodiment 1. Each of the first layer, the second layer, the third layer, and so forth is a layer of either the first thin film 321 or the second thin film 322. The layered first thin film 321 and second thin film 322 have different optical film thicknesses, which makes different the thicknesses of the first layer, the second layer, the third layer, and so forth. As used herein, the term optical film thickness can be calculated with the following mathematical formula 1.

$Nd = d \times N \times 4/\lambda$ ($Nd$: optical film thickness, $d$: physical film thickness, $N$: refractive index, $\lambda$: central wavelength) [Mathematical Formula 1]

In this embodiment, the infrared light reflector 3 has a light transmission property of equal to or more than 80% transmittance with respect to each wavelength in a wavelength band of 450 nm to 650 nm; equal to or more than 90% average transmittance in the wavelength band of 450 nm to 650 nm; and less than 15% transmittance with respect to a wavelength of 700 nm. Additionally, the wavelength with respect to which the infrared light reflector 3 has the 50% transmittance is longer than the wavelength with respect to which the infrared light absorber 2 has the 50% transmittance.

The IR cut filter 1 including the infrared light absorber 2 and the infrared light reflector 3 has a thickness of 0.4 mm to 1.6 mm, for example. That is, the thickness of the infrared light absorber glass 21 constituting the infrared light absorber 2 and the thickness of the transparent substrate 31 constituting the infrared light reflector 3 are within a total thickness of, for example, 0.4 mm to 1.6 mm, of the thicknesses of the infrared light absorber 2 and the infrared light reflector 3.

A combination of the light transmission properties of the above-described infrared light absorber 2 and infrared light reflector 3 provides the IR cut filter 1 with a light transmission property of: equal to or more than 90% transmittance with respect to a wavelength in the wavelength band of 450 nm to 550 nm; 50% transmittance with respect to a wavelength in the wavelength band of 620 nm to 670 nm; and less than 5% transmittance with respect to a wavelength of 700 nm.

Figure 3:
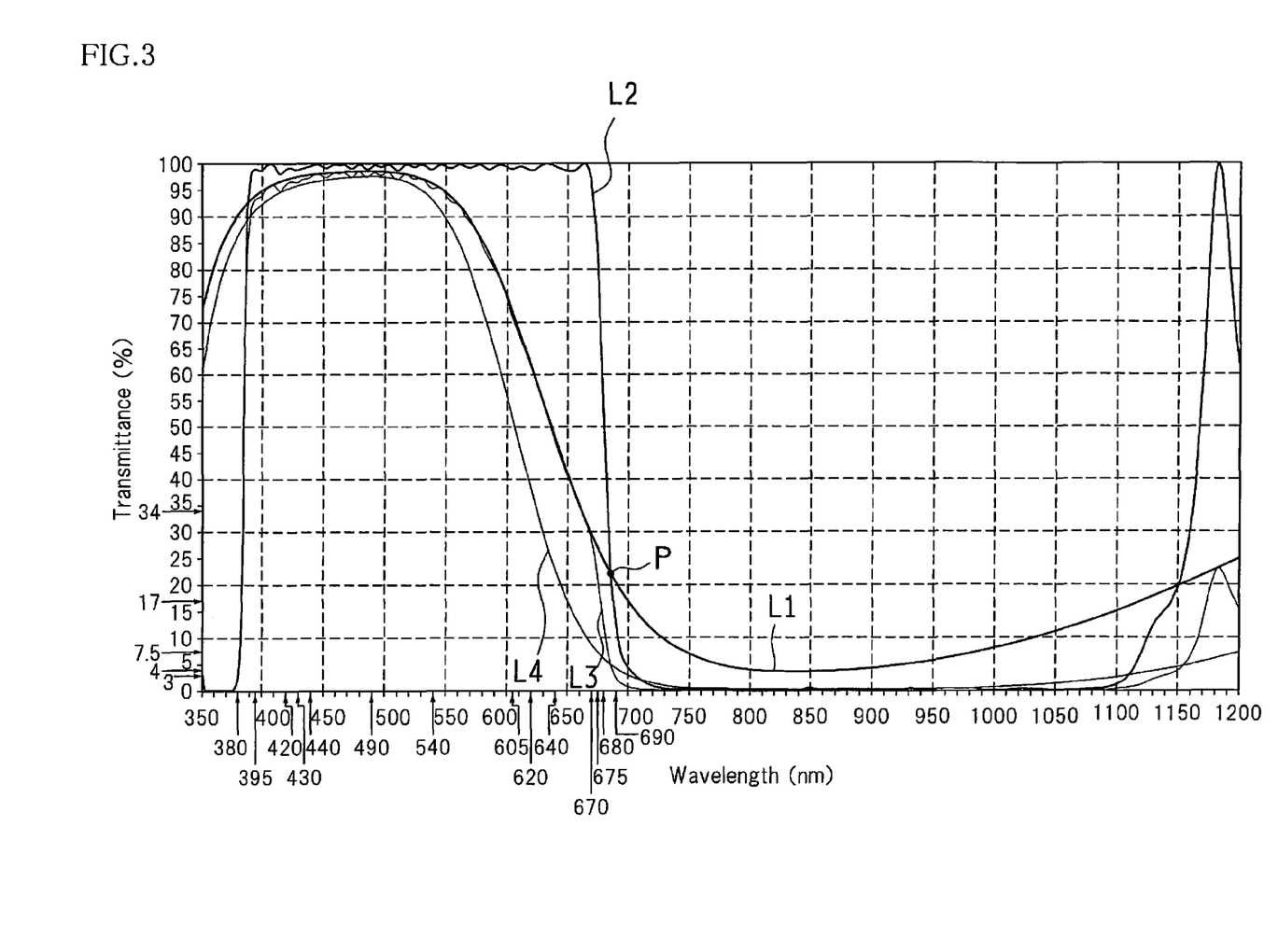
FIG. 3 is a graph illustrating a light transmission property of an IR cut filter according to working example 1 of embodiment 1.
Figure 4:
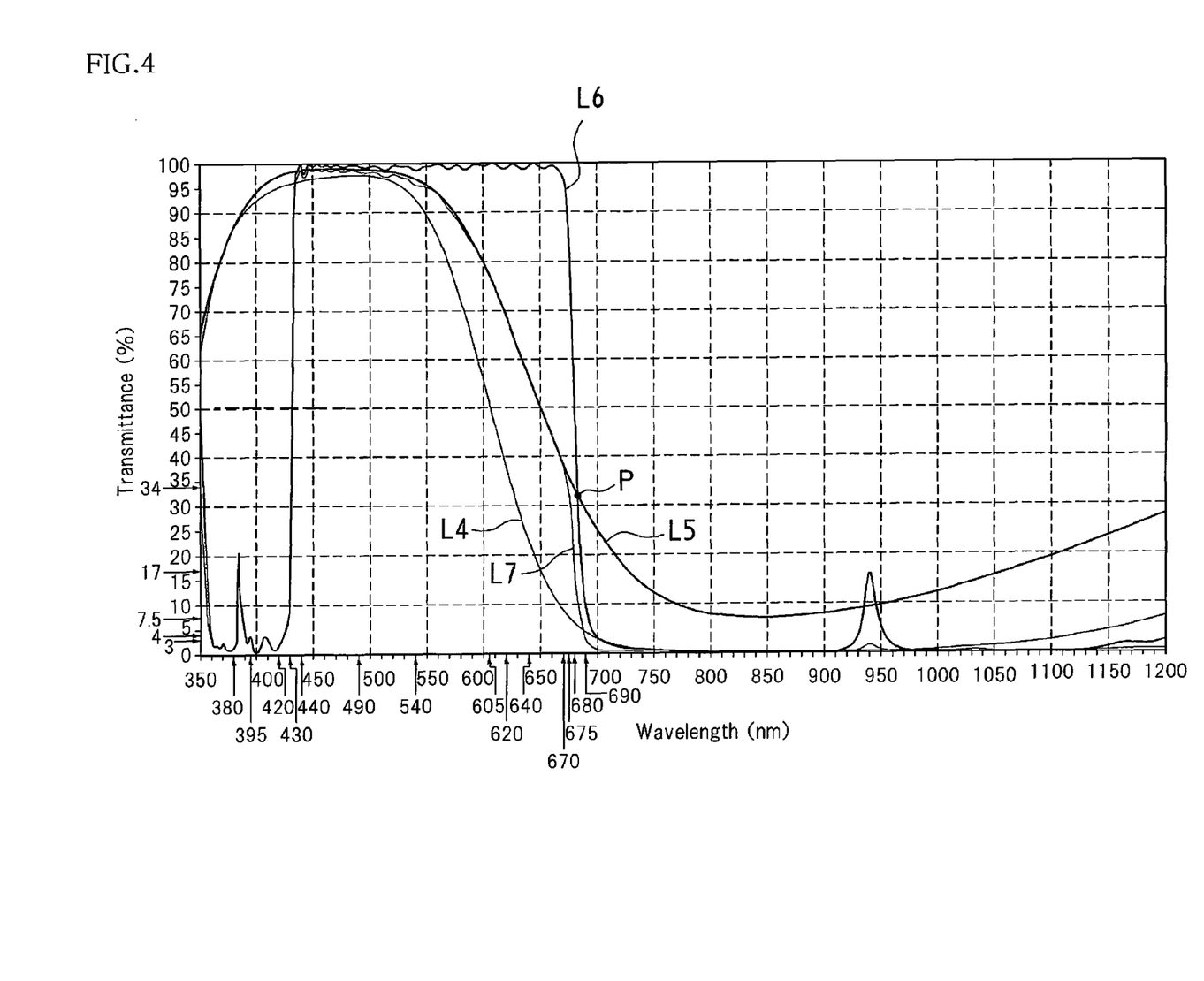
FIG. 4 is a graph illustrating a light transmission property of an IR cut filter according to working example 2 of embodiment 1.
Figure 5:
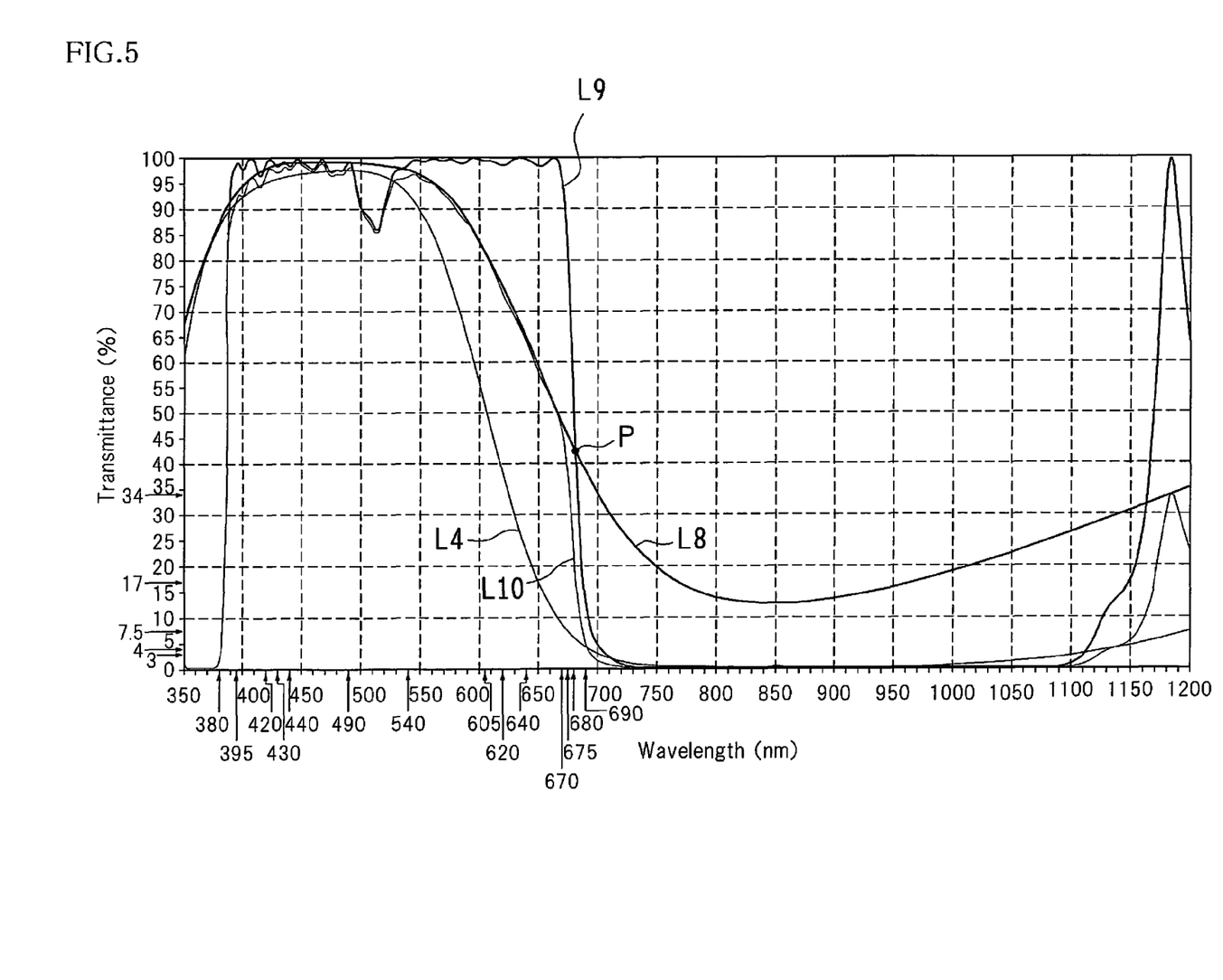
FIG. 5 is a graph illustrating a light transmission property of an IR cut filter according to working example 3 of embodiment 1.

Specific examples of the IR cut filter 1 according to embodiment 1 will be described below as working examples 1 to 3. FIGS. 3 to 5 and Tables 1 and 2 below show the wavelength properties and configurations of IR cut filters 1 according to working examples 1 to 3.

WORKING EXAMPLE 1

In working example 1, the infrared absorbing glass 21 used was a blue glass with pigments such as of copper ions dispersed. The blue glass was used in the form of a glass plate of 0.8 mm thick with a refractive index N of approximately 1.5 in atmosphere. Over the one principal surface 211 of the infrared absorbing glass 21, the constituent films of the anti-reflection film 22 were formed by vacuum deposition, the constituent films including, in the order set forth, an $Al_2O_3$ film with a refractive index N of 1.6 in atmosphere, a $ZrO_2$ film with a refractive index N of 2.0 in atmosphere, and a $MgF_2$ film with a refractive index of 1.4 in N atmosphere. Thus, the infrared light absorber 2 was obtained.

This infrared light absorber 2 has a light transmission property L1 as shown in FIG. 3. In working example 1, the angle of incidence of light radiation is set at 0 degrees, that is, light radiation is incident vertically.

Specifically, the infrared absorbing glass 21 has a light transmission property of: equal to or more than 90% transmittance in the wavelength band of 400 nm to 550 nm; decreasing transmittance in the wavelength band of 550 nm to 700 nm; 50% transmittance with respect to a wavelength of approximately 640 nm; and approximately 17% transmittance with respect to a wavelength of 700 nm.

The transparent substrate 31 of the infrared light reflector 3 used was a glass plate of 0.3 mm thick with a refractive index N of 1.5 in atmosphere. As the first thin film 321 constituting the infrared light reflecting film 32, $TiO_2$ with a refractive index N of 2.30 in atmosphere was used. As the second thin film 322 constituting the infrared light reflecting film 32, $SiO_2$ with a refractive index N of 1.46 in atmosphere was used. The central wavelength of $TiO_2$ and $SiO_2$ was set at 688 nm.

The thin films 321 and 322 were formed over the one principal surface 311 of the transparent substrate 31 by the above-described method for fabricating the infrared light reflecting film 32 of 40 layers of thin films 321 and 322 having optical film thicknesses listed in Table 1. Thus, the infrared light reflector 3 was obtained.

TABLE 1

| Layer | Evaporant | Refractive index N | Optical film thickness Nd | Central wavelength λ (nm) |
|---|---|---|---|---|
| 1 | $TiO_2$ | 2.30 | 0.122 | 688 |
| 2 | $SiO_2$ | 1.46 | 0.274 | 688 |
| 3 | $TiO_2$ | 2.30 | 1.296 | 688 |
| 4 | $SiO_2$ | 1.46 | 1.279 | 688 |
| 5 | $TiO_2$ | 2.30 | 1.152 | 688 |
| 6 | $SiO_2$ | 1.46 | 1.197 | 688 |
| 7 | $TiO_2$ | 2.30 | 1.115 | 688 |
| 8 | $SiO_2$ | 1.46 | 1.180 | 688 |
| 9 | $TiO_2$ | 2.30 | 1.094 | 688 |
| 10 | $SiO_2$ | 1.46 | 1.173 | 688 |
| 11 | $TiO_2$ | 2.30 | 1.089 | 688 |

TABLE 1-continued

| Layer | Evaporant | Refractive index N | Optical film thickness Nd | Central wavelength λ (nm) |
|---|---|---|---|---|
| 12 | $SiO_2$ | 1.46 | 1.176 | 688 |
| 13 | $TiO_2$ | 2.30 | 1.094 | 688 |
| 14 | $SiO_2$ | 1.46 | 1.179 | 688 |
| 15 | $TiO_2$ | 2.30 | 1.096 | 688 |
| 16 | $SiO_2$ | 1.46 | 1.187 | 688 |
| 17 | $TiO_2$ | 2.30 | 1.103 | 688 |
| 18 | $SiO_2$ | 1.46 | 1.205 | 688 |
| 19 | $TiO_2$ | 2.30 | 1.142 | 688 |
| 20 | $SiO_2$ | 1.46 | 1.234 | 688 |
| 21 | $TiO_2$ | 2.30 | 1.275 | 688 |
| 22 | $SiO_2$ | 1.46 | 1.422 | 688 |
| 23 | $TiO_2$ | 2.30 | 1.437 | 688 |
| 24 | $SiO_2$ | 1.46 | 1.486 | 688 |
| 25 | $TiO_2$ | 2.30 | 1.422 | 688 |
| 26 | $SiO_2$ | 1.46 | 1.475 | 688 |
| 27 | $TiO_2$ | 2.30 | 1.463 | 688 |
| 28 | $SiO_2$ | 1.46 | 1.492 | 688 |
| 29 | $TiO_2$ | 2.30 | 1.424 | 688 |
| 30 | $SiO_2$ | 1.46 | 1.472 | 688 |
| 31 | $TiO_2$ | 2.30 | 1.446 | 688 |
| 32 | $SiO_2$ | 1.46 | 1.488 | 688 |
| 33 | $TiO_2$ | 2.30 | 1.422 | 688 |
| 34 | $SiO_2$ | 1.46 | 1.462 | 688 |
| 35 | $TiO_2$ | 2.30 | 1.424 | 688 |
| 36 | $SiO_2$ | 1.46 | 1.468 | 688 |
| 37 | $TiO_2$ | 2.30 | 1.396 | 688 |
| 38 | $SiO_2$ | 1.46 | 1.424 | 688 |
| 39 | $TiO_2$ | 2.30 | 1.352 | 688 |
| 40 | $SiO_2$ | 1.46 | 0.696 | 688 |

Table 1 lists the composition of the infrared light reflecting film 32 of the IR cut filter 1 and the optical film thicknesses of the thin films (the first thin film 321 and the second thin film 322).

This infrared light reflector 3 has a light transmission property L2 as shown in FIG. 3. Specifically, the infrared light reflector 3 (the infrared light reflecting film 32) has a light transmission property of: approximately 100% transmittance in the wavelength band of 395 nm to 670 nm (which is a wavelength band including the 450 nm to 650 nm wavelength band); steeply decreasing transmittance with respect to wavelengths beyond approximately 670 nm; 50% transmittance with respect to a wavelength of approximately 680 nm; and approximately 4% transmittance with respect to a wavelength of 700 nm.

Then, the other principal surface 312 of the transparent substrate 31 was bonded on the other principal surface 212 of the infrared absorbing glass 21 as shown in FIG. 1, thus obtaining the IR cut filter 1 of 1.1 mm thick according to working example 1.

The IR cut filter 1 according to working example 1 has a light transmission property L3 as shown in FIG. 3, which is a combination of the light transmission properties of the infrared light absorber 2 and the infrared light reflector 3. Specifically, the IR cut filter 1 according to working example 1 has a light transmission property of: equal to or more than 90% transmittance in the wavelength band of 400 nm to 550 nm; decreasing transmittance in the wavelength band of 550 nm to 700 nm; 50% transmittance with respect to a wavelength of approximately 640 nm; and approximately 0% transmittance with respect to a wavelength of 700 nm.

WORKING EXAMPLE 2

In working example 2, the infrared absorbing glass 21 used was a blue glass with pigments such as of copper ions dispersed. The blue glass was used in the form of a glass plate of 0.55 mm thick with a refractive index N of approximately 1.5 in atmosphere. Over the one principal surface 211 of the infrared absorbing glass 21, the constituent films of the antireflection film 22 were formed by vacuum deposition, the constituent films including, in the order set forth, an $Al_2O_3$ film with a refractive index N of 1.6 in atmosphere, a $ZrO_2$ film with a refractive index N of 2.0 in atmosphere, and a $MgF_2$ film with a refractive index N of 1.4 in atmosphere. Thus, the infrared light absorber 2 was obtained.

This infrared light absorber 2 has a light transmission property L5 as shown in FIG. 4. In working example 2, the angle of incidence of light radiation is set at 0 degrees, that is, light radiation is incident vertically.

Specifically, the infrared absorbing glass 21 has a light transmission property of: equal to or more than 90% transmittance in the wavelength band of 400 nm to 550 nm; decreasing transmittance in the wavelength band of 550 nm to 700 nm; 50% transmittance with respect to a wavelength of approximately 650 nm; and approximately 25% transmittance with respect to a wavelength of 700 nm.

The transparent substrate 31 of the infrared light reflector 3 used was a glass plate of 0.3 mm thick with a refractive index of 1.5 in N atmosphere. As the first thin film 321 constituting the infrared light reflecting film 32, $TiO_2$ with a refractive index of 2.30 in N atmosphere was used. As the second thin film 322 constituting the infrared light reflecting film 32, $SiO_2$ with a refractive index of 1.46 in N atmosphere was used. The central wavelength of $TiO_2$ and $SiO_2$ was set at 748 nm.

The thin films 321 and 322 were formed over the one principal surface 311 of the transparent substrate 31 by the above-described method for fabricating the infrared light reflecting film 32 of 40 layers of thin films 321 and 322 having optical film thicknesses listed in Table 2. Thus, the infrared light reflector 3 was obtained.

TABLE 2

| Layer | Evaporant | Refractive index N | Optical film thickness Nd | Central wavelength λ (nm) |
|---|---|---|---|---|
| 1 | $TiO_2$ | 2.30 | 0.135 | 748 |
| 2 | $SiO_2$ | 1.46 | 0.135 | 748 |
| 3 | $TiO_2$ | 2.30 | 1.129 | 748 |
| 4 | $SiO_2$ | 1.46 | 1.188 | 748 |
| 5 | $TiO_2$ | 2.30 | 1.042 | 748 |
| 6 | $SiO_2$ | 1.46 | 1.107 | 748 |
| 7 | $TiO_2$ | 2.30 | 1.014 | 748 |
| 8 | $SiO_2$ | 1.46 | 1.073 | 748 |
| 9 | $TiO_2$ | 2.30 | 1.018 | 748 |
| 10 | $SiO_2$ | 1.46 | 1.058 | 748 |
| 11 | $TiO_2$ | 2.30 | 1.021 | 748 |
| 12 | $SiO_2$ | 1.46 | 1.054 | 748 |
| 13 | $TiO_2$ | 2.30 | 1.020 | 748 |
| 14 | $SiO_2$ | 1.46 | 1.066 | 748 |
| 15 | $TiO_2$ | 2.30 | 1.017 | 748 |
| 16 | $SiO_2$ | 1.46 | 1.092 | 748 |
| 17 | $TiO_2$ | 2.30 | 1.019 | 748 |
| 18 | $SiO_2$ | 1.46 | 1.123 | 748 |
| 19 | $TiO_2$ | 2.30 | 1.100 | 748 |
| 20 | $SiO_2$ | 1.46 | 1.272 | 748 |
| 21 | $TiO_2$ | 2.30 | 1.390 | 748 |
| 22 | $SiO_2$ | 1.46 | 1.408 | 748 |
| 23 | $TiO_2$ | 2.30 | 1.223 | 748 |
| 24 | $SiO_2$ | 1.46 | 1.290 | 748 |
| 25 | $TiO_2$ | 2.30 | 1.389 | 748 |
| 26 | $SiO_2$ | 1.46 | 1.497 | 748 |
| 27 | $TiO_2$ | 2.30 | 1.321 | 748 |
| 28 | $SiO_2$ | 1.46 | 1.273 | 748 |
| 29 | $TiO_2$ | 2.30 | 1.335 | 748 |
| 30 | $SiO_2$ | 1.46 | 1.521 | 748 |
| 31 | $TiO_2$ | 2.30 | 1.506 | 748 |
| 32 | $SiO_2$ | 1.46 | 1.536 | 748 |
| 33 | $TiO_2$ | 2.30 | 1.550 | 748 |
| 34 | $SiO_2$ | 1.46 | 1.545 | 748 |
| 35 | $TiO_2$ | 2.30 | 1.523 | 748 |
| 36 | $SiO_2$ | 1.46 | 1.576 | 748 |
| 37 | $TiO_2$ | 2.30 | 1.492 | 748 |
| 38 | $SiO_2$ | 1.46 | 1.526 | 748 |
| 39 | $TiO_2$ | 2.30 | 1.528 | 748 |
| 40 | $SiO_2$ | 1.46 | 0.760 | 748 |

The table 2 lists the composition of the infrared light reflecting film 32 of the IR cut filter 1 and the optical film thicknesses of the thin films (the first thin film 321 and the second thin film 322).

This infrared light reflector 3 has a light transmission property L6 as shown in FIG. 4. Specifically, the infrared light reflector 3 (the infrared light reflecting film 32) has a light transmission property of: equal to or less than 10% average transmittance in the wavelength band of 380 nm to 420 nm; steeply increasing transmittance with respect to wavelengths of beyond 430 nm; approximately 100% (over 90% on average) transmittance in the wavelength band of 450 nm to 670 nm (which is a wavelength band including the wavelength band of 450 nm to 650 nm); steeply decreasing transmittance with respect to wavelengths of beyond approximately 670 nm; 50% transmittance with respect to a wavelength of approximately 680 nm; and approximately 3% transmittance with respect to a wavelength of 700 nm.

Then, the other principal surface 312 of the transparent substrate 31 was bonded on the other principal surface 212 of the infrared absorbing glass 21 as shown in FIG. 1, thus obtaining the IR cut filter 1 of 0.85 mm thick according to working example 2.

The IR cut filter 1 according to working example 2 has a light transmission property L7 as shown in FIG. 4, which is a combination of the light transmission properties of the infrared light absorber 2 and the infrared light reflector 3. Specifically, the IR cut filter 1 according to working example 2 blocks light in the wavelength band of 380 nm to 420 nm in addition to light of over 700 nm wavelengths. More specifically, the IR cut filter 1 has a light transmission property of equal to or less than 10% average transmittance in the wavelength band of 380 nm to 420 nm; steeply increasing transmittance with respect to wavelengths of beyond 430 nm; equal to or more than 90% transmittance in the wavelength band of 450 nm to 550 nm; decreasing transmittance in the wavelength band of 550 nm to 700 nm; 50% transmittance with respect to a wavelength of approximately 650 nm; and approximately 0% transmittance with respect to a wavelength of 700 nm.

WORKING EXAMPLE 3

In working example 3, the infrared absorbing glass 21 used was a blue glass with pigments such as of copper ions dispersed. The blue glass was used in the form of a glass plate of 0.45 mm thick with a refractive index N of approximately 1.5 in atmosphere. Over the one principal surface 211 of the infrared absorbing glass 21, the constituent films of the antireflection film 22 were formed by vacuum deposition, the constituent films including, in the order set forth, an $Al_2O_3$ film with a refractive index N of 1.6 in atmosphere, a $ZrO_2$ film with a refractive index N of 2.0 in atmosphere, and a $MgF_2$ film with a refractive index N of 1.4 in atmosphere. Thus, the infrared light absorber 2 was obtained.

This infrared light absorber 2 has a light transmission property L8 as shown in FIG. 5. In working example 2, the angle of incidence of light radiation is set at 0 degrees, that is, light radiation is incident vertically.

Specifically, the infrared absorbing glass 21 has a light transmission property of: equal to or more than 90% transmittance in the wavelength band of 400 nm to 550 nm; decreasing transmittance in the wavelength band of 550 nm to 700 nm; 50% transmittance with respect to a wavelength of approximately 670 nm; and approximately 34% transmittance with respect to a wavelength of 700 nm.

The transparent substrate 31 of the infrared light reflector 3 used was a glass plate of 0.3 mm thick with a refractive index N of 1.5 in atmosphere, similarly to working example 1. As the first thin film 321 constituting the infrared light reflecting film 32, $TiO_2$ with a refractive index N of 2.30 in atmosphere was used, similarly to working example 1. As the second thin film 322 constituting the infrared light reflecting film 32, $SiO_2$ with a refractive index N of 1.46 in atmosphere was used, similarly to working example 1. The central wavelength of $TiO_2$ and $SiO_2$ was set at 688 nm.

The thin films 321 and 322 were formed over the one principal surface 311 of the transparent substrate 31 by the above-described method for fabricating the infrared light reflecting film 32 of 40 layers of thin films 321 and 322 having optical film thicknesses listed in Table 1, similarly to working example 1. Thus, the infrared light reflector 3 was obtained.

The infrared light reflector 3 has a light transmission property L9 as shown in FIG. 5. As described above, the infrared light reflector 3 according to working example 3 was obtained in a similar manner to working example 1. However, a fabrication error occurred which made the light transmission property L9 of the infrared light reflector 3 (the infrared light reflecting film 32) according to working example 3 slightly different from the light transmission property L2 (see FIG. 3) of the infrared light reflector 3 (the infrared light reflecting film 32) according to working example 1. Specifically, the infrared light reflector 3 (the infrared light reflecting film 32) according to working example 3 has a light transmission property L9 of: equal to or more than 90% transmittance in the wavelength band of 400 nm to 440 nm; equal to or more than 80% transmittance in the wavelength band of 450 nm to 650 nm even though a ripple occurs in this wavelength band (specifically in the wavelength band of 490 nm to 540 nm); and equal to or more than 90% average transmittance in the wavelength band of 450 nm to 650 nm. The infrared light reflector 3 (the infrared light reflecting film 32) also has a light transmission property of: steeply decreasing transmittance with respect to wavelengths of beyond approximately 670 nm; 50% transmittance with respect to a wavelength of approximately 680 nm; and approximately 5% transmittance with respect to a wavelength of 700 nm.

Then, the other principal surface 312 of the transparent substrate 31 was bonded on the other principal surface 212 of the infrared absorbing glass 21 as shown in FIG. 1, thus obtaining the IR cut filter 1 of 0.75 mm thick according to working example 3.

The IR cut filter 1 according to working example 3 has a light transmission property L10 as shown in FIG. 5, which is a combination of the light transmission properties of the infrared light absorber 2 and the infrared light reflector 3. Specifically, the IR cut filter 1 according to working example 3 has a light transmission property of: equal to or more than 90% average transmittance in the wavelength band of 400 nm to 550 nm; decreasing transmittance in the wavelength band of 550 nm to 700 nm; 50% transmittance with respect to a wavelength of approximately 670 nm; and approximately 0% transmittance with respect to a wavelength of 700 nm.

As indicated by the light transmission properties L3, L7, and L10 (see FIGS. 3 to 5) of the IR cut filters 1 according to working examples 1 to 3, a combination of the infrared light absorber 2 and the infrared light reflector 3 provides the IR cut filter 1 according to embodiment 1 with a light transmission property of: equal to or more than 90% transmittance with respect to a wavelength in the wavelength band of 450 nm to 550 nm; 50% transmittance with respect to a wavelength in the wavelength band of 620 nm to 670 nm; and approximately 0% (less than 5%) transmittance with respect to a wavelength of 700 nm. That is, the IR cut filter 1 obtains a light transmission property close to the sensitive property of the human eye; the transmittance gradually decreases through the visible spectrum and the infrared spectrum into approximately 0% with respect to a wavelength of 700 nm. In particular, the IR cut filter 1 according to working example 2 has a light transmission property closer to the human sensitive property than the IR cut filters according to working examples 1 and 3. This is because in the IR cut filter 1 according to working example 2, transmittance is restricted to equal to or less than 10% on average in the wavelength band of 380 nm to 420 nm, that is, in the wavelength band in which ultraviolet radiation, which is invisible to the human eye, has influence.

The light transmission properties L3, L7, and L10 of the IR cut filters 1 according to working examples 1 to 3 shown in FIGS. 3 to 5 will be described in more detail below by comparison with the light transmission property L4 of the conventional IR cut filter.

The conventional IR cut filter having the light transmission property L4 shown in FIGS. 3 to 5 is made up of an infrared light absorber with anti-reflection films on both sides of an infrared absorbing glass. In the conventional IR cut filter, the thickness of the infrared absorbing glass as the infrared light absorber is set at 1.6 mm to match the point of approximately 0% transmittance with 700 nm.

In contrast, the IR cut filters 1 according to working examples 1 to 3 each are equal to or less than half the thickness of the conventional IR cut filter (the infrared light absorber) having the light transmission property L4. Also in the IR cut filters 1 according to working examples 1 to 3, the infrared light reflector 3 is combined with the infrared light absorber 2 having the light transmission property L1, L5, or L8, which shows higher transmittance than the transmittance of the conventional IR cut filter in the visible spectrum, especially in the wavelength band of 600 nm to 700 nm. Thus, the point of approximately 0% transmittance is matched with 700 nm.

Hence, the IR cut filters 1 according to working examples 1 to 3 having the light transmission properties L3, L7, and L10 each have higher transmittance compared with the light transmission property L4 of the conventional IR cut filter in the visible spectrum, especially in the wavelength band of 600 nm to 700 nm. Additionally, in the light transmission properties L3, L7, and L10 of the IR cut filters 1 according to working examples 1 to 3, the transmittance with respect to light radiation of 700 nm wavelength is closer to 0% compared with the light transmission property L4 of the conventional IR cut filter.

Specifically, the conventional IR cut filter has a light transmission property L4 of approximately 55% transmittance with respect to a wavelength of 600 nm; 50% transmittance with respect to a wavelength of approximately 605 nm; approximately 7.5% transmittance with respect to a wavelength of 675 nm; and approximately 3% transmittance with respect to a wavelength of 700 nm.

In contrast, the IR cut filter 1 according to working example 1 has a light transmission property L3 (see FIG. 3) of: approximately 75% transmittance with respect to a wavelength of 600 nm; 50% transmittance with respect to a wavelength of approximately 640 nm; approximately 20% transmittance with respect to a wavelength of 675 nm; and approximately 0% transmittance with respect to a wavelength of 700 nm. The IR cut filter 1 according to working example 2 has a light transmission property L7 (see FIG. 4) of 80% transmittance with respect to a wavelength of 600 nm; approximately 50% transmittance with respect to a wavelength of approximately 650 nm; approximately 30% transmittance with respect to a wavelength of 675 nm; and approximately 0% transmittance with respect to a wavelength of 700 nm. The IR cut filter 1 according to working example 3 has a light transmission property L10 (see FIG. 5) of: approximately 85% transmittance with respect to a wavelength of 600 nm; 50% transmittance with respect to a wavelength of approximately 670 nm; approximately 40% transmittance with respect to a wavelength of 675 nm; and approximately 0% transmittance with respect to a wavelength of 700 nm.

Thus, the light transmission properties L3, L7, and L10 of the IR cut filters 1 according to working examples 1 to 3 have high transmittance in the wavelength band of 600 nm to 700 nm, especially in the wavelength band of 600 nm to 675 nm, while having a transmittance close to 0% with respect to a wavelength of 700 nm, compared with the light transmission property L4 of the conventional IR cut filter. That is, it is confirmed that the IR cut filters 1 according to working examples 1 to 3 sufficiently transmit red visible light radiation of 600 nm to 700 nm wavelengths while sufficiently blocking infrared light in excess of 700 nm. Once any of the IR cut filters 1 according to working examples 1 to 3 is mounted in the imaging unit, the imaging device 5 captures a bright image with enhanced redness compared with the conventional art, which ensures capture of bright images in dark locations.

Also in the IR cut filter 1 according to embodiment 1, the infrared light reflector 3 is combined with the infrared light absorber 2 to minimize the amount of light reflected by the infrared light reflector 3. Specifically, in the IR cut filter 1 according to working example 1, the infrared light reflector 3 has a half-wavelength of approximately 680 nm as shown in FIG. 3, which is longer than the half-wavelength (approximately 640 nm) of the infrared light absorber 2. In the IR cut filter 1 according to working example 2, the infrared light reflector 3 has a half-wavelength of approximately 680 nm as shown in FIG. 4, which is longer than the half-wavelength (approximately 650 nm) of the infrared light absorber 2. In the IR cut filter 1 according to working example 3, the infrared light reflector 3 has a half-wavelength of approximately 680 nm as shown in FIG. 5, which is longer than the half-wavelength (approximately 670 nm) of the infrared light absorber 2. Thus, in the IR cut filters 1 according to working examples 1 to 3, the half-wavelength (wavelength at which the transmittance is 50%) of the infrared light reflector 3 is longer than the half-wavelength of the infrared light absorber 2. A transmittance curve representing the light transmission properties L1, L5, and L8 of the infrared light absorber 2 intersects a transmittance curve representing the light transmission properties L2, L6, and L9 of the infrared light reflector 3 at an intersection point P. A wavelength at the intersection point P (wavelength at which the transmittance of the infrared light absorber 2 and the transmittance the infrared light reflector 3 agree) is longer than the half-wavelength of the infrared light absorber 2. The transmittances of the infrared light absorber 2 and the infrared light reflector 3 with respect to the wavelength at the intersection point P are equal to or less than 50%. Thus, in the IR cut filters 1 according to working examples 1 to 3, the infrared light absorber 2 absorbs infrared light to minimize the amount of light reflected by the infrared light reflector 3, thereby minimizing occurrence of flare and ghost caused by light reflection by the infrared light reflector 3.

Also in the IR cut filters 1 according to working examples 1 to 3 of embodiment 1, the half-wavelength of the infrared light reflector 3 is longer than the half-wavelength of the infrared light absorber 2. The half-wavelength of the IR cut filter 1 as a combination of the infrared light absorber 2 and the infrared light reflector 3 approximately agrees to the half-wavelength of the infrared light absorber 2. That is, the half-wavelength of the IR cut filter 1 is set based on the infrared light absorber 2, which has less of a variation of the transmittance caused by a design error than the infrared light reflector 3. Hence, in the fabrication of the IR cut filter 1, the variation of the light transmission property of the IR cut filter caused by a design error during fabrication is reduced.

Also in the IR cut filter 1 according to working examples 1 to 3 of embodiment 1, the infrared light reflector 3 has a light transmission property of: equal to or more than 80% transmittance with respect to each wavelength in the wavelength band of 450 nm to 650 nm; and equal to or more than 90% average transmittance in the wavelength band of 450 nm to 650 nm. Thus, the IR cut filter 1 obtains a light transmission property that depends on the light transmission property of the infrared light absorber 2 in the wavelength band of 450 nm to 650 nm. The obtained light transmission property is close to the sensitive property of the human eye; the transmittance gradually decreases through the visible spectrum and the infrared spectrum into approximately 0% with respect to a wavelength of 700 nm. Additionally, high transmittance is obtained in the visible spectrum, especially in the wavelength band of red visible light radiation (600 nm to 700 nm).

The infrared light reflector 3 has equal to or more than 90% transmittance with respect to light radiation of the half-wavelength of the infrared light absorber 2 so that the half-wavelength of the IR cut filter 1 approximately agrees to the half-wavelength of the infrared light absorber 2. This ensures that the IR cut filter 1 has the light transmission property that the infrared light absorber has and that is close to the sensitive property of the human eye; the transmittance gradually decreases in the 550 nm to 700 nm wavelengths. Thus, a light transmission property close to the sensitive property of the human eye is obtained.

Further in the IR cut filters 1 according to working examples 1 to 3 of embodiment 1, the infrared light absorber 2 is thinner than the conventional IR cut filter having the light transmission property L4. This makes the IR cut filter 1 as thin as or thinner than the conventional IR cut filter.

<Embodiment 2>

Figure 6:
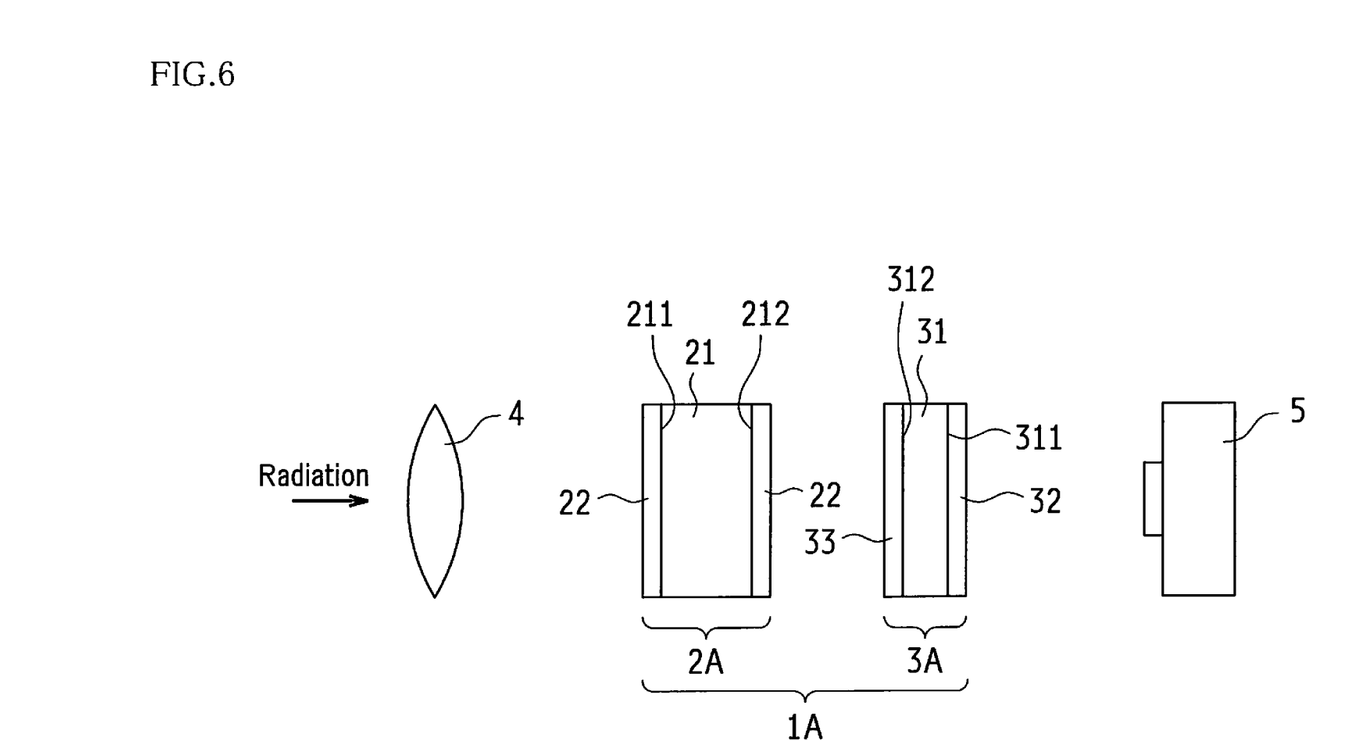
FIG. 6 is a schematic diagram illustrating an imaging unit including an IR cut filter according to the embodiment 2.

As shown in FIG. 6, an IR cut filter 1A according to embodiment 2 is disposed in an imaging unit between an imaging optics 4 and an imaging device 5, which are aligned along the optical axis of an imaging optical path.

As shown in FIG. 6, the IR cut filter 1A according to embodiment 2 includes an infrared light absorber 2A that absorbs infrared light and an infrared light reflector 3A that reflects infrared light.

In the imaging unit, the infrared light absorber 2A and the infrared light reflector 3A are distanced from one another between the imaging optics 4 and the imaging device 5, which are aligned along the optical axis of the imaging optical path.

The infrared light absorber 2A is deposed closer to the imaging optics 4 than the infrared light reflector 3A is to the imaging optics 4.

The infrared light absorber 2A includes an infrared absorbing glass 21 and anti-reflection films 22 on both principal surfaces 211 and 212 of the infrared absorbing glass 21.

The infrared absorbing glass 21 is a blue glass with pigments such as of copper ion dispersed, examples including a rectangular thin glass plate of 0.2 to 1.2 mm thick, similarly to the infrared absorbing glass 21 of the infrared light absorber 2 described in embodiment 1.

The anti-reflection film 22 is formed by vacuum deposition using a well-known vacuum deposition apparatus (not shown). Either a single layer of $MgF_2$, a multilayer film of $Al_2O_2$, $ZrO_2$, and $MgF_2$, or a multilayer film of $TiO_2$ and $SiO_2$ is deposited on both principal surfaces 211 and 212 of the infrared absorbing glass 21. During the deposition operation of the anti-reflection film 22, the film thickness thereof is monitored so that at the time when the film thickness reaches a predetermined film thickness, a shutter (not shown) adjacent to an evaporation source (not shown) is closed to stop the deposition of the evaporant, thus discontinuing the deposition operation. The anti-reflection film 22 has a refractive index that is larger than the refractive index N (approximately 1.0) of atmosphere in atmosphere and that is smaller than the refractive index of the infrared absorbing glass 21.

The infrared light absorber 2A includes an infrared absorbing glass 21 similar to embodiment 1. Hence, the infrared light absorber 2A has a light transmission property similar to the light transmission property of the infrared light absorber 2 of embodiment 1. Specifically, the light transmission property is 50% transmittance with respect to a wavelength in the wavelength band of 620 nm to 670 nm, and 10% to 40% transmittance with respect to a wavelength of 700 nm. The light transmission property of the infrared light absorber 2A has a maximum transmittance of equal to or more than 90% with respect to a wavelength in the wavelength band of 400 nm to 550 nm.

The infrared light reflector 3A includes a transparent substrate 31, an infrared light reflecting film 32 on one principal surface 311 of the transparent substrate 31, and an anti-reflection film 33 on the other principal surface 312 of the transparent substrate 31. As shown in FIG. 6, in the imaging unit, the infrared light reflector 3A is disposed with its surface at the infrared light reflecting film 32 side opposed to the imaging device 5.

The transparent substrate 31 includes a clear and colorless glass that transmits visible light radiation and infrared light, examples including a rectangular thin glass plate with a thickness of 0.2 to 1.0 mm, similarly to the transparent substrate 31 described in embodiment 1.

The infrared light reflecting film 32 is a multilayer film of a first thin film 321 of high refractive index material and a second thin film 322 of low refractive index material, similarly to the infrared light reflecting film 32 described in embodiment 1, the first thin film 321 and the second thin film 322 being alternately laminated a plurality of times.

The infrared light reflector 3A includes an infrared light reflecting film 32 similar to the infrared light reflecting film 32 of embodiment 1 on the transparent substrate 31. Hence, the infrared light reflector 3A has a light transmission property similar to the light transmission property of the infrared light reflector 3 of embodiment 1. Specifically, the infrared light reflector 3A has a light transmission property of: equal to or more than 80% transmittance with respect to each wavelength in the wavelength band of 450 nm to 650 nm; equal to or more than 90% average transmittance in the wavelength band of 450 nm to 650 nm; 50% transmittance with respect to a wavelength in the wavelength band of 670 nm to 690 nm; and less than 15% transmittance with respect to a wavelength of 700 nm. The wavelength with respect to which the infrared light reflector 3A has the 50% transmittance is longer than the wavelength with respect to which the infrared light absorber 2 has the 50% transmittance.

The anti-reflection film 33 is formed by vacuum deposition using a well-known vacuum deposition apparatus (not shown). Either a single layer of $MgF_2$, a multilayer film of $Al_2O_2$, $ZrO_2$, and $MgF_2$, or a multilayer film of $TiO_2$ and $SiO_2$ is deposited on the other principal surface 312 of the transparent substrate 31. During the deposition operation of the anti-reflection film 33, the film thickness thereof is monitored so that at the time when the film thickness reaches a predetermined film thickness, a shutter (not shown) adjacent to an evaporation source (not shown) is closed to stop the deposition of the evaporant, thus discontinuing the deposition operation. The anti-reflection film 33 has a refractive index that is larger than the refractive index N (approximately 1.0) of atmosphere in atmosphere and that is smaller than the refractive index of the transparent substrate 31.

A total thickness of the infrared light absorber 2A and the infrared light reflector 3A is 0.4 to 1.6 mm, for example. That is, the thickness of the infrared light absorber glass 21 constituting the infrared light absorber 2A and the thickness of the transparent substrate 31 constituting the infrared light reflector 3A are suitably adjusted within a total thickness of, for example, 0.4 mm to 1.6 mm, of the thicknesses of the infrared light absorber 2 and the infrared light reflector 3.

A combination of the light transmission properties of the above described infrared light absorber 2A and infrared light reflector 3A provides the IR cut filter 1A with a light transmission property similar to the light transmission property of the IR cut filter 1 according to embodiment 1. Specifically, the light transmission property is equal to or more than 90% transmittance with respect to a wavelength in the wavelength band of 450 nm to 550 nm; 50% transmittance with respect to a wavelength in the wavelength band of 620 nm to 670 nm; and less than 5% transmittance with respect to a wavelength of 700 nm.

Thus, since the IR cut filter 1A according to embodiment 2 has a light transmission property similar to the light transmission property of the IR cut filter 1 according to embodiment 1, similar advantageous effects to those of the IR cut filter 1 according to embodiment 1 are obtained.

While in embodiments 1 and 2 a glass plate is used as the transparent substrate 31, this should not be construed in a limiting sense. It is also possible to use, for example, a crystal plate insofar as light radiation is transmitted. The transparent substrate 31 may also be a double refraction plate or a set of plurality of double refraction plates. A crystal plate and a glass plate may be combined to form the transparent substrate 31.

While in embodiments 1 and 2 $TiO_2$ is used as the first thin film 321, this should not be construed in a limiting sense. It is also possible to use, for example, $ZrO_2$, $TaO_2$, or $Nb_2O_2$, insofar as the first thin film 321 is a high refractive index material. While $SiO_2$ is used as the second thin film 322, this should not be construed in a limiting sense. It is also possible to use, for example, $MgF_2$ insofar as the second thin film 322 is a low refractive index material.

In the IR cut filters 1 and 1A according to embodiments 1 and 2, the infrared light absorbers 2 and 2A are disposed closer to the imaging optics 4 side than the infrared light reflectors 3 and 3A are to the imaging optics 4 in the imaging unit. This, however, should not be construed in a limiting sense. The IR cut filters 1 and 1A may have the infrared light reflectors 3 and 3A disposed closer to the imaging optics 4 side than the infrared light absorbers 2 and 2A are to the imaging optics 4.

For example, in the case where the IR cut filters 1 and 1A have the infrared light absorbers 2 and 2A disposed at the imaging optics 4 side in the imaging unit, the infrared light absorbers 2 and 2A absorb light reflected by the infrared light reflectors 3 and 3A. This reduces reflection of light by the infrared light reflectors 3 and 3A and scattering of light in the imaging optics 4, thereby minimizing occurrence of ghost, compared with the arrangement of the infrared light reflectors 3 and 3A at the imaging optics 4 side. Meanwhile, in the case where the IR cut filters 1 and 1A have the infrared light reflectors 3 and 3A disposed at the imaging optics 4 side, this enlarges the distance between the infrared light reflectors 3 and 3A and the imaging device 5; specifically, the distance between the imaging device 5 and a foreign object generated inside the infrared light reflectors 3 and 3A in the fabrication process. This reduces image degradation caused by a foreign object, compared with the arrangement of the infrared light absorbers 2 and 2A at the imaging optics 4 side.

In embodiments 1 and 2, the infrared light absorbers 2 and 2A each use the infrared absorbing glass 21 and the anti-reflection film 22 on the one principal surface 211 or both principal surfaces 211 and 212 of the infrared absorbing glass 21. This, however, should not be construed as limiting the infrared light absorbers 2 and 2A of the present invention. For example, if the refractive index of the infrared absorbing glass 21 in the atmosphere is approximately the same as the refractive index of the atmosphere, the anti-reflection film 22 need not be formed. That is, an infrared absorbing glass without an anti-reflection film may serve as the infrared light absorber.

In embodiment 1, the infrared light reflector 3 includes the transparent substrate 31 bonded on the other principal surface 212 of the infrared absorbing glass 21 and the infrared light reflecting film 32 on the one principal surface 311 of the transparent substrate 31. In embodiment 2, the infrared light reflector 3A includes the transparent substrate 31, the infrared light reflecting film 32 on the one principal surface 311 of the transparent substrate 31, and the anti-reflection film 33 on the other principal surface 312 of the transparent substrate 31. This, however, should not be construed as limiting the infrared light reflectors 3 and 3A of the present invention. For example, the infrared light reflecting film on the surface of the infrared absorbing glass may be an infrared light reflector.

Specifically, as opposed to embodiment 1, where the infrared light reflecting film 32 is disposed on the one principal surface 311 of the transparent substrate 31 bonded on the other principal surface 212 of the infrared absorbing glass 21, the infrared light reflecting film 32 as an infrared light reflector may be directly disposed on the other principal surface 212 of the infrared absorbing glass 21. As a specific example, the infrared light reflecting film 32 as the infrared light reflector may be formed by alternately depositing $TiO_2$ and $SiO_2$ on the other principal surface 212 of the infrared absorbing glass 21. Disposing the infrared light reflecting film 32 directly on the other principal surface 212 of the infrared absorbing glass 21 in this manner makes the IR cut filter 1 thinner.

While in embodiment 2 the anti-reflection film 33 is disposed on the other principal surface 312 of the transparent substrate 31, the anti-reflection film 33 need not be formed if the refractive index of the transparent substrate 31 in the atmosphere is approximately the same as the refractive index of the atmosphere.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

The present application claims priority on Japanese Patent Application No. 2010-139686 filed in Japan on Jun. 18, 2010. The contents of this application are incorporated herein by reference in their entirety.

Industrial Applicability

The present invention is applicable to IR cut filters that transmit visible light and block infrared light.

| Description of the Reference Numeral | |
|---|---|
| 1, 1A | IR cut filter |
| 2, 2A | Infrared light absorber |
| 21 | Infrared absorbing glass |
| 211, 212 | Principal surface |
| 22 | Anti-reflection film |
| 3, 3A | Infrared light reflector |
| 31 | Transparent substrate |
| 311, 312 | Principal surface |
| 32 | Infrared light reflecting film |
| 321 | First thin film |
| 322 | Second thin film |
| 33 | Anti-reflection film |
| 4 | Imaging optics |
| 5 | Imaging device |

The invention claimed is:

1. An infrared (IR) cut filter to block infrared light, the IR cut filter comprising:
   an infrared light absorber configured to absorb the infrared light; and
   an infrared light reflector configured to reflect the infrared light,
   wherein the infrared light absorber has a light transmission property of 50% transmittance with respect to a wavelength in a wavelength band of 620 nm to 670 nm and 10% to light 40% transmittance with respect to a wavelength of 700 nm,
   wherein the infrared light reflector has a light transmission property of 50% transmittance with respect to a wavelength in a wavelength band of 670 nm to 690 nm,
   wherein the wavelength with respect to which the infrared light reflector has the 50% transmittance is longer than the wavelength with respect to which the infrared light absorber has the 50% transmittance, and
   wherein a combination of the infrared light absorber and the infrared light reflector provides a light transmission property of 50% transmittance with respect to a wavelength in the wavelength band of 620 nm to 670 nm, 20% to 40% transmittance with respect to a wavelength of 675 nm, and less than 5% transmittance with respect to a wavelength of 700 nm.

2. The IR cut filter according to claim 1,
   wherein the infrared light reflector has a light transmission property of less than 15% transmittance with respect to a wavelength of 700 nm.

3. The IR cut filter according to claim 1, wherein the infrared light reflector has light transmission properties of equal to or more than 80% transmittance with respect to each wavelength in a wavelength band of 450 nm to 650 nm, and equal to or more than 90% average transmittance in the wavelength band of 450 nm to 650 nm.

4. The IR cut filter according to claim 1, wherein a single infrared light reflector is disposed on one principal surface of a single infrared light absorber.

5. An imaging unit, comprising the IR cut filter according to claim 1.

6. An infrared (IR) cut filter to block infrared light, the IR cut filter comprising:
   an infrared light absorber configured to absorb the infrared light; and
   an infrared light reflector configured to reflect the infrared light,
   wherein the infrared light absorber has a light transmission property of 50% transmittance with respect to a wavelength in a wavelength band of 640 nm to 670 nm and 10% to 40% transmittance with respect to a wavelength of 700 nm,
   wherein the infrared light reflector has a light transmission property of 50% transmittance with respect to a wavelength in a wavelength band of 670 nm to 690 nm,
   wherein the wavelength with respect to which the infrared light reflector has the 50% transmittance is longer than the wavelength with respect to which the infrared light absorber has the 50% transmittance, and
   wherein a combination of the infrared light absorber and the infrared light reflector provides a light transmission property of 50% transmittance with respect to a wavelength in the wavelength band of 640 nm to 670 nm and less than 5% transmittance with respect to a wavelength of 700 nm.

7. The IR cut filter according to claim 6,
   wherein the infrared light reflector has a light transmission property of less than 15'% transmittance with respect to a wavelength of 700 nm.

8. The IR cut filter according to claim 6, wherein the infrared light reflector has light transmission properties of equal to or more than 80% transmittance with respect to each wavelength in a wavelength band of 450 nm to 650 nm, and equal to or more than 90% average transmittance in the wavelength band of 450 nm to 650 nm.

9. The IR cut filter according to claim 6, wherein a single infrared light reflector is disposed on one principal surface of a single infrared light absorber.

10. An imaging unit comprising the IR cut filter according to claim 6.

* * * * *